United States Patent [19]

Gregar et al.

[11] Patent Number: 5,308,808
[45] Date of Patent: May 3, 1994

[54] ORGANIC OR ORGANOMETALLIC TEMPLATE MEDIATED CLAY SYNTHESIS

[75] Inventors: Kathleen C. Gregar, Bolingbrook; Randall E. Winans; Robert E. Botto, both of Downers Grove, all of Ill.

[73] Assignee: United States Department of Energy, Washington, D.C.

[21] Appl. No.: 836,747

[22] Filed: Feb. 19, 1992

[51] Int. Cl.$^5$ .................. C04B 33/02; C04B 33/04
[52] U.S. Cl. .................. 501/146; 501/145; 501/141; 423/328.1; 423/404; 106/486; 106/487; 502/62; 502/80; 502/84; 502/251; 502/257; 502/258; 502/259
[58] Field of Search .......... 501/141, 145, 146; 502/60, 64, 77, 80, 82, 84, 251, 257, 258, 259, 260; 423/328.1, 331, 335, 464; 106/483, 486, 487

[56] References Cited

U.S. PATENT DOCUMENTS

| | | | |
|---|---|---|---|
| 3,887,454 | 6/1975 | Hickson | 502/521 |
| 4,388,285 | 6/1983 | Rankel et al. | 423/329 |
| 4,619,820 | 10/1986 | Valyocsik | 423/328 |
| 4,665,110 | 5/1987 | Zones | 423/277 |
| 4,912,073 | 3/1990 | Chu | 502/85 |
| 4,982,028 | 1/1991 | Dessau et al. | 585/277 |
| 5,047,141 | 8/1991 | Chu | 208/120 |
| 5,102,643 | 4/1992 | Kresge et al. | 423/328 |
| 5,108,725 | 4/1992 | Beck et al. | 423/263 |
| 5,110,572 | 5/1992 | Calabro et al. | 423/328 |
| 5,145,816 | 9/1992 | Beck et al. | 502/60 |
| 5,156,828 | 10/1992 | Degnan et al. | 423/709 |
| 5,156,829 | 10/1992 | McCullen et al. | 423/718 |

OTHER PUBLICATIONS

Barrer and Dicks, J. Chem. Soc. (A), 1967 discloses synthetic clays made with organic molecules in the synthesis gel.

Carrado, Thiyagarajan, Winans & Botto Hydrothermal Crystallization of Porphyrin-Containing Layer Silicats Feb. 20, 1991.

Primary Examiner—Mark L. Bell
Assistant Examiner—Michael Marcheschi
Attorney, Agent, or Firm—Hugh W. Glenn; Robert J. Fisher; William R. Moser

[57] ABSTRACT

A method for incorporating diverse Varieties of intercalants or templates directly during hydrothermal synthesis of clays such as hectorite or montmorillonite-type layer-silicate clays. For a hectorite layer-silicate clay, refluxing a gel of silica sol, magnesium hydroxide sol and lithium fluoride for two days in the presence of an organic or organometallic intercalant or template results in crystalline products containing either (a) organic dye molecules such as ethyl violet and methyl green, (b) dye molecules such as alcian blue that are based on a Cu(II)-phthalocyannine complex, or (c) transition metal complexes such as Ru(II)phenanthroline and Co(III)sepulchrate or (d) water-soluble porphyrins and metalloporphyrins. Montmorillonite-type clays are made by the method taught by U.S. Pat. No. 3,887,454 issued to Hickson, Jun. 13, 1975; however, a variety of intercalants or templates may be introduced. The intercalants or templates should have (i) water-solubility, (ii) positive charge, and (iii) thermal stability under moderately basic (pH 9-10) aqueous reflux conditions or hydrothermal pressurized conditions for the montmorillonite-type clays.

20 Claims, 12 Drawing Sheets

EXCHANGEABLE CATIONS, H$_2$O d (001)

ALCIAN BLUE

FIG. 2B

ETHYL VIOLET

FIG. 2C

Ru(o-PHEN)$_3$ DICHLORIDE

FIG. 2D

TMPyP

FIG. 2E

TAP

FIG. 2F

METHYL GREEN

FIG. 2G

Co(III) SEPULCHRATE TRICHLORIDE

ORGANIC OR ORGANOMETALLIC TEMPLATE MEDIATED CLAY SYNTHESIS

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

Figure 1:
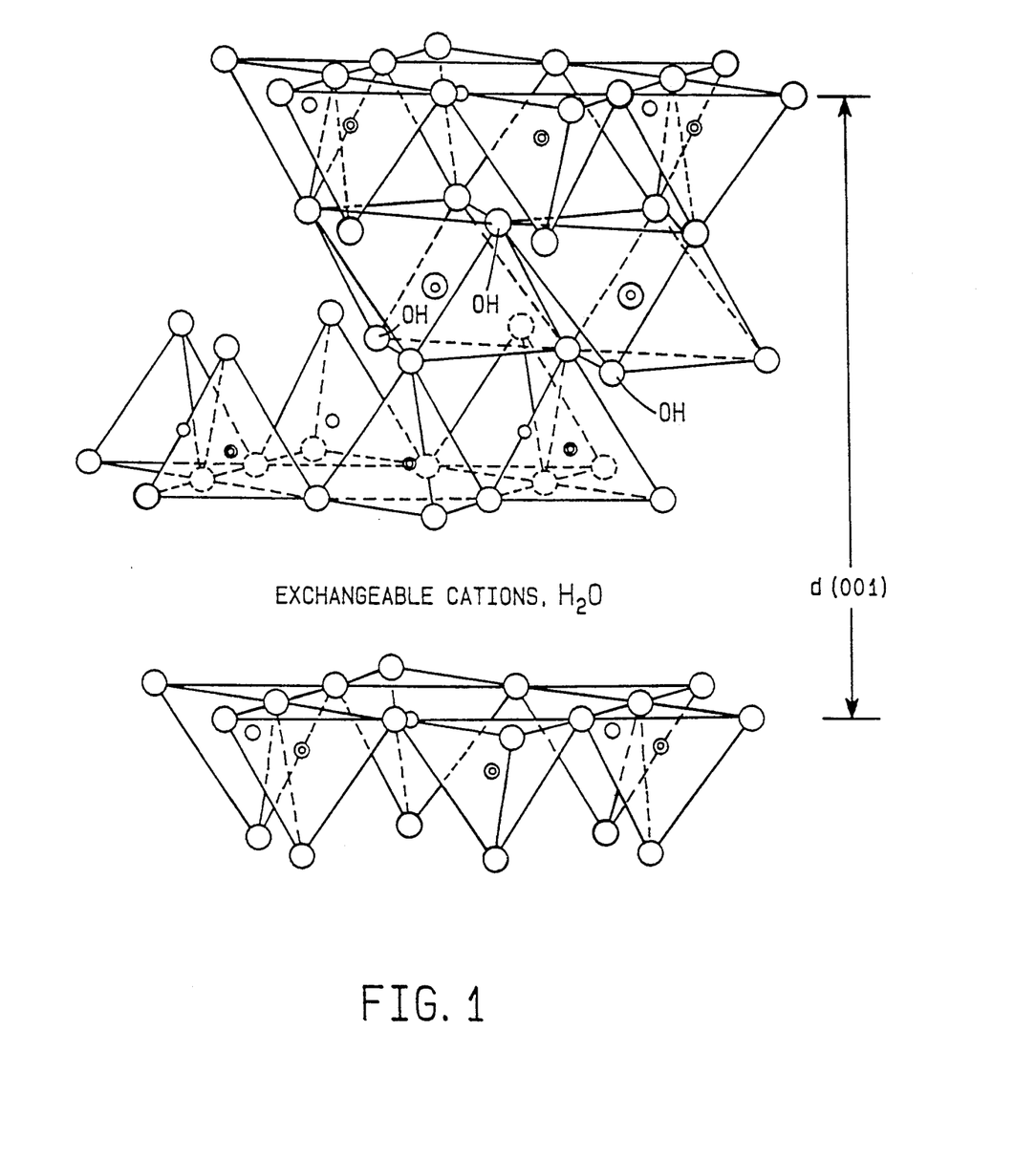
FIG. 1 is a schematic diagram of 2:1 structure of smectite having large open circles of oxygen or hydroxide, small enclosed circles of silicon and large enclosed circles either magnesium (hectorite) or aluminum (montmorillonite)
Figure 2A:
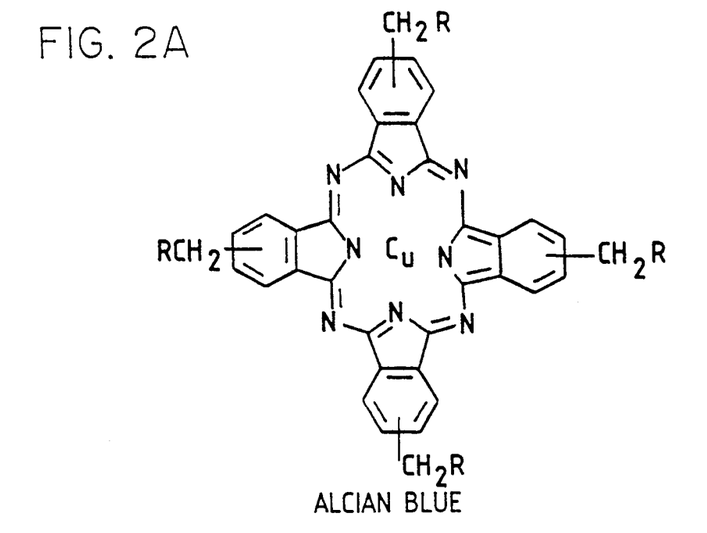
FIGS. 2A–2G are schematic diagrams showing the structures of representative templates applicable to this invention; wherein TAP is tetrakis(N,N,N-trimethylanilinium)porphyrin and TMPyP is tetrakis(N-methylpyridyl)porphyrin.
Figure 2B:
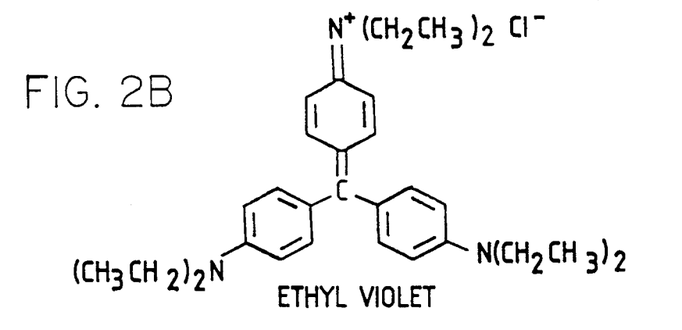
Figure 2C:
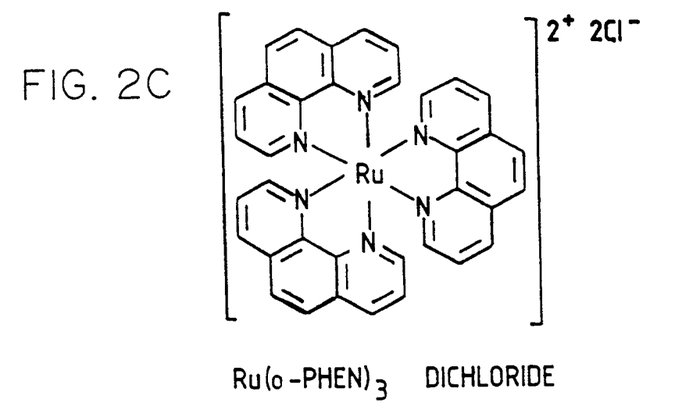
Figure 2D:
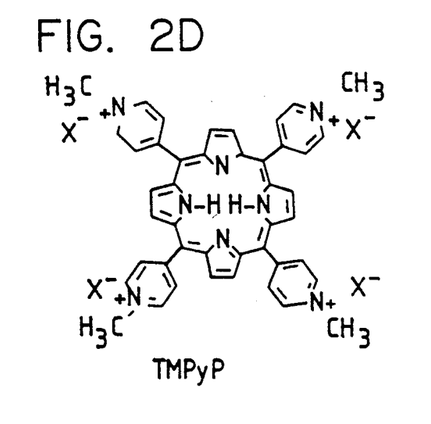
Figure 2E:
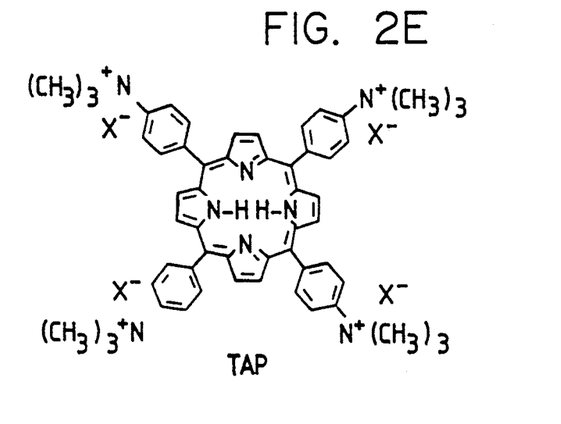
Figure 2F:
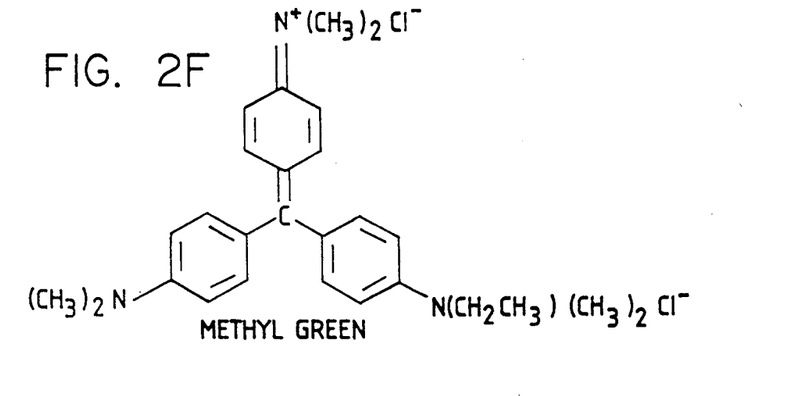
Figure 2G:
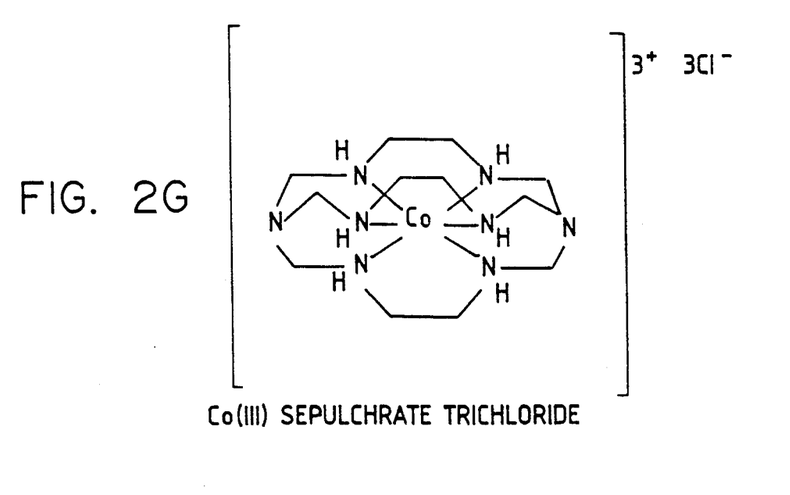

The synthesis of new materials with potential as acidic catalysts or supports is of interest to industries that employ zeolites and clays in these traditional uses, e.g. the petrochemical industry. These minerals are crystalline, open-framework silicates that have pores and channels (in the case or three-dimensional zeolites) or galleries (two-dimensional clays and pillared clays) available as microenvironments for chemical reaction. The smectite clay minerals of interest in this invention have two tetrahedral silicate layers sandwiching a central octahedral layer in a so-called 2:1 arrangement, see FIG. 1. Isomorphous substitutions in the lattice such as Mg(II) for Al(III) in the octahedral layers of montmorillonite clays or Li(I) for Mg(II) in the octahedral layers of hectorite clays cause an overall negative charge that is compensated for by the presence of interlayer, or gallery cations. A significant amount of interlayer water is also present and the cations are easily exchangeable. The d(001) spacing indicated in FIG. 1 is the crystallographic unit cell dimension along the c-axis, and includes the fixed measurement of the clay layer ($\sim 9.6$Å) along with the variable interlayer or gallery spacing.

The usual method for modifying such silicate minerals is by ion-exchange, where the alkali or alkaline earth cation is replaced by, for example, a catalytically active species. However, a more direct method is to incorporate intercalants, especially more complex molecules, during hydrothermal crystallization of the silicate. The inventive technique is applicable to hectorite clays that were made in the presence of water-soluble porphyrins and metalloporphyrins, and is also applicable to a wide variety of organics and organometallics, of the types illustrated in FIG. 2.

Mn-porphyrins supported on clays have recently been demonstrated as promising hydrocarbon monooxygenation catalysts. The adsorption characteristics of dye-clay mineral systems have been extensively studied in terms of staining tests and metachromasy, which has implications in geochemistry and agriculture, and fluorescence to probe photoprocesses at solid surfaces and photo-redox reactions in organized media. The dyes methyl green (MG) and alcian blue (AB) are biological stains, and ethyl violet (EV) is known to display metachromasy with clays. The other intercalants or templates used are bulky transition metal complexes, such as Ru(II)o-phenanthroline) and Co(III)sepulchrate. Metal chelates such as Ru(II)- and Fe(III)-phenanthrolines adsorbed onto clays have been studied by electric dichroism, in terms of ligation, and are props of the gallery space as pillars. All synthesized materials were characterized by X-ray powder diffraction (XRD), microanalysis, $N_2$ BET surface area measurements, thermal gravietric analysis, and diffuse reflectance UV-visible spectroscopy (DRS) when appropriate.

OBJECTS AND SUMMARY OF THE INVENTION

A general object of the invention is to provide an alternate method of producing synthetic clays having photochemically or electrochemically or catalytically active template materials distributed throughout.

Another object of the invention is to provide an alternative method of producing synthetic clays having photochemically or electrochemically or catalytically active template materials having larger pore sizes than heretofore possible.

Still another object of the invention is to provide a method of producing clays having photochemically or electrochemically or catalytically active template materials which is applicable to a wide variety of templates.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Synthetic hectorites were prepared from the precursor gels that were of composition 0.32 R, 1.0 LiF, 5.3 $Mg(OH)_2$, 8 $SiO_2$, n $H_2O$ to correlate with the ideal hectorite composition $Ex_{0.66}[Li_{0.66}Mg_{5.34}Si_8O_{20}(OH)_4]$ where R=organic base or salt and Ex=exchangeable monocation. Aqueous gels consisting of a 0.06:0.20:1.00:1.52 organic:LiF:$Mg(OH)_2$:$Si_2$ molar ratio worked best. A typical reaction began by dissolving 0.72 mmol of organic (e.g. ethyl violet) in water in a 250-mL round-bottom flask, to which 0.12g (0.0048 mol) of LiF was added with vigorous stirring. Separately, 6.5g (0.024 mol) of $MgCl_2 \cdot 6H_2O$ was dissolved in $H_2O$ and the mixture was allowed to react with 32 mL of 2 N $NH_4OH$ to crystallize $Mg(OH)_2$, which was then centrifuged and washed with at least 4 volumes of water to remove excess ions. This was transferred with water to the organic-LiF slurry. After the slurry was stirred for 10–15 min. 9.73g (0.036) mol) of Ludox HS-30, a $Na^+$-stabilized 30% silica sol (obtained from DuPont), was slowly added and the total volume brought to about 150 mL (2–5 wt% solids were customarily used). After 2–3 days at reflux, crystallization was complete, as determined by the lack of $Mg(OH)_2$ reflections in X-ray powder diffraction spectra; these occur at 4.77 and 2.37 Å for the (001) and (101) reflections, respectively. Solids were centrifuged, washed, and air-dried.

Since each porphyrin (see FIG. 2) contains four positively charged groups, only 0.2 mmol of porphyrin was needed in the preparation outlined above. The purely inorganic clay synthetic Li-hectorite (SLH) used gel molar ratios of 0.26:2.00:1.52 LiF: MgO: $SiO_2$. All organic complexes and other gel components were used as received from Aldrich except for the silica source, which was Ludox HS-30, a $Na^+$-stabilized 30% silica sol obtained from DuPont. For ion-exchange experiments the natural hectorite SHCa-1 (from near Hector, Calif.) was employed. As received from the Source Clays Repository, Columbia, Mo., this hectorite contains nearly 50% by weight calcium carbonate impurity; this was removed prior to use, along with some iron, by conventional sedimentation techniques. By X-ray powder diffraction, it is estimated that <2% $CaCO_3$ remains in the slurry. Ion-exchange salts were added to clay slurries to a final concentration of 2.5–5.0 mM. These stirred for 18–24 hrs. at room temperature followed by centrifugation, washing until decants were clear, and air-drying. Thin films were made at the same time by air-drying a small portion of the slurry on a glass microscope slide. Very thin films of the pure dyes were made by air-drying on glass slides dilute solutions of the dyes dissolved in water; more concentrated solutions resulted in darker films.

X-ray powder diffraction (XRD) was done on a Scintag Pad-V instrument using Ca K radiation and a hyperpure germanium solid-state detector, at a scan rate of 0.5°2Θ/min. The instrument was calibrated to the (101) reflection of low-quartz at 3.34Å. Samples were run as the oriented films prepared on glass slides, or as powders in horizontally-held trays. Thermal gravimetric analysis was performed on a Cahn 121 electrobalance with a temperature ramp from 25–800° C. at a rate of 10° C./min under an oxygen atmosphere (50 cc/min); data were collected either every two or five seconds. Nitrogen BET surface areas were determined on a Quantasorb Junior sorption analyzer from Quantachrome Corp. Samples were fully outgassed prior to measurement; heating to 100° C. overnight in a nitrogen atmosphere was generally sufficient. Correlations of fits to the data were at least 0.96, and usually 0.99–1.00. UV visible spectroscopy of solutions was performed on a Shimadzu UV-160 instrument in the slow analysis mode. Diffuse reflectance (DR) absorption spectra were recorded on a Cary 3290 spectrometer equipped with an integrating sphere assembly; all DR spectra were scanned at 1nm/sec. A filter change occurs at 575 nm which can sometimes be seen as an artifact in the DR spectra.

Figure 3:
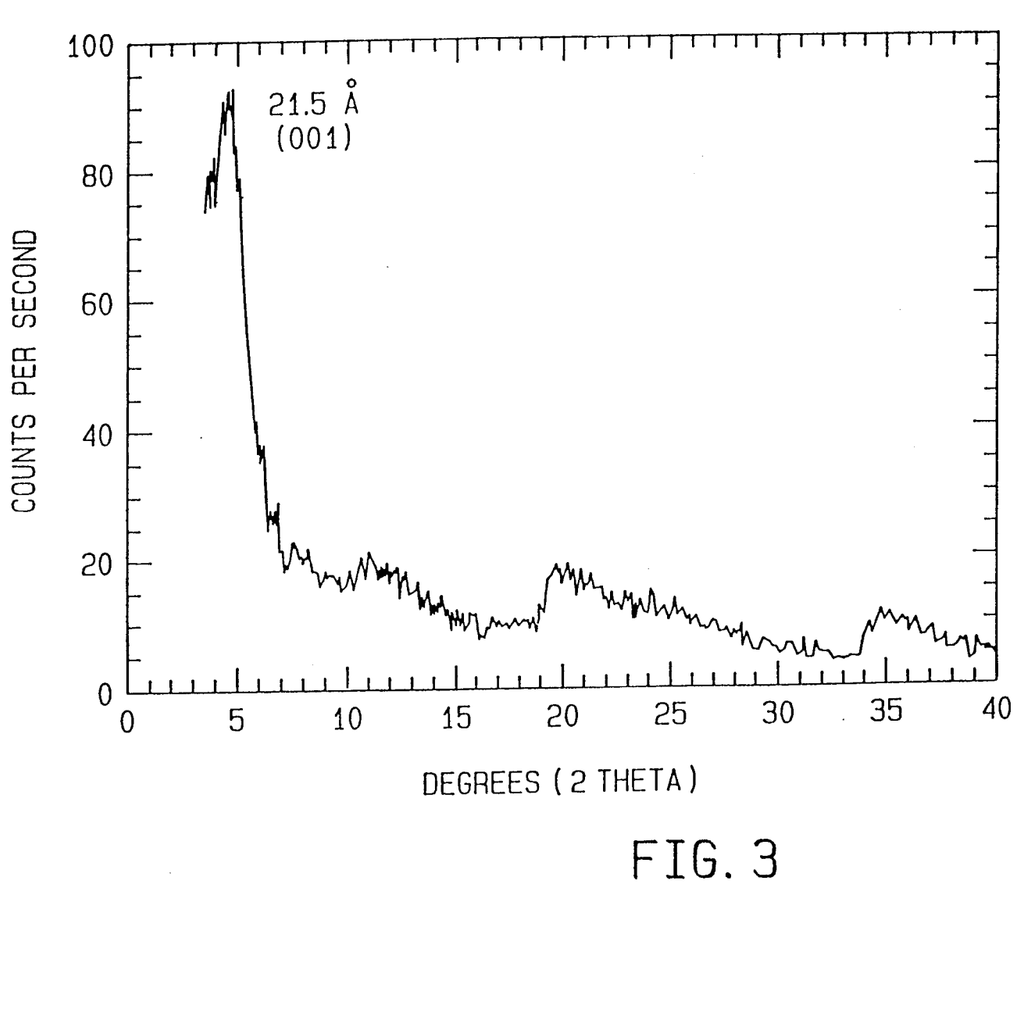
FIG. 3 is graphical representation of the XRD spectrum of synthetic ethyl violet-hectorite in the powder form.
Figure 4A:
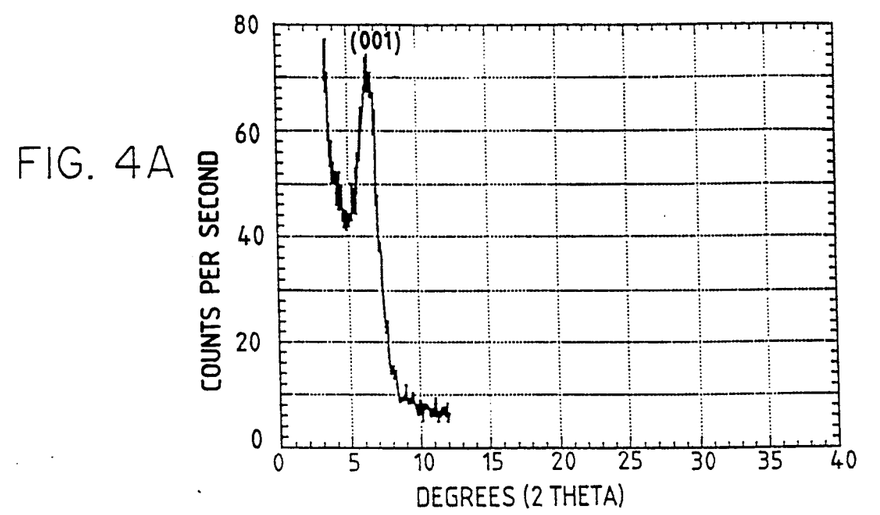
FIGS. 4a and 4b are graphical representations of the oriented thin film XRD spectra of; (a) synthetic Co(III)-sepulchrate-hectorite and (b) ion-exchanged Co(III)-sepulchrate-SCHa (a natural hectorite)
Figure 4B:
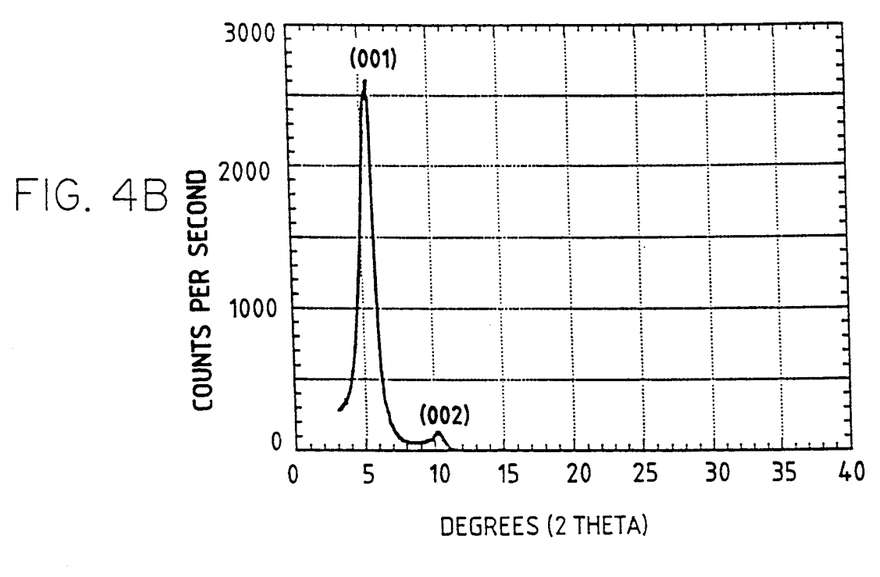

The spectrum of synthetic ethyl violet-hectorite shown in FIG. 3 is typical of all the synthetic hectorites in powder form. Here, the d(001) spacing is quite high at 21.5Å. At approximately 8.0 Å a weak reflecting appears that is typical of amorphous silica, the only common impurity in these products. The remaining reflections at 4.52 Å and 2.56 Å correspond to the clay (110,020) and (130) reflections, respectively. Note that there is no indication of unreacted $Mg(OH)_2$; if the reaction were not complete, very intense and narrow peaks would occur at 4.77 Å and 2.37 Å for the (001) and (101) reflections, respectively, of the magnesium hydroxide mineral brucite. A typical thin film spectrum of a synthetic hectorite is shown in FIG. 4a for syn. Co(III)sepulchrate-hectorite. Films made from unwashed products did not indicate that presence of brucite after two days of reaction; therefore, spectra were routinely taken to only 15° 2Θ for thin films. FIG. 4b displays the XRD spectrum of a thin film of ion-exchanged Co(III)sepulchrate-SHCa. Since hectorites orient to a high degree along the (001) axis as thin films, only these reflections are observed out to 40° C. 2Θ. In this case the material is highly ordered: a (002) reflection is observed, and the relative intensity of the (001) reflection is extremely high at ~3000 cps. Other ion-exchanged hectorites have an intensity for this reflection in the range of 250–1000 cps, whereas the synthetic hectorites are on the order of only 100 cps (e.g. FIG. 4a).

Table I summarizes microanalysis and XRD data for both synthetic and ion-exchanged hectorite clays. Experimental C/N ratios were calculated to compare to theoretical values and are also included in the table. Table II lists organic cation exchange capacities (c.e.c.) and surface area data for the clays, arranged into groups of ion-exchanged vs. synthetic materials. Some synthetic porphyrin-hectorites are included for comparison. The organic c.e.c. is calculated in the following manner: the % organic is estimated from the microanalysis data by adding %C and %N (not %H since that value includes hydrogen in the clay), divided by the molecular weight of the templating cation (since this is the form present in the clay) and multiplied by the charge of the cation. For example, methyl green-SHCa has ~19.0% organic (see Table I): 19 g organic/100 g sample) ×(1 mole/401 g MG)×2 charge equivalents=95 meq/100 gm sample. The c.e.c. of SHCa-1 is given as 44 meq/100 gm, but since the raw form of SHCa-1 contains approximately 50% $CaCO_3$ impurity, its actual c.e.c. can be assumed to be closer to 80 meq/100 gm.

Figure 5:
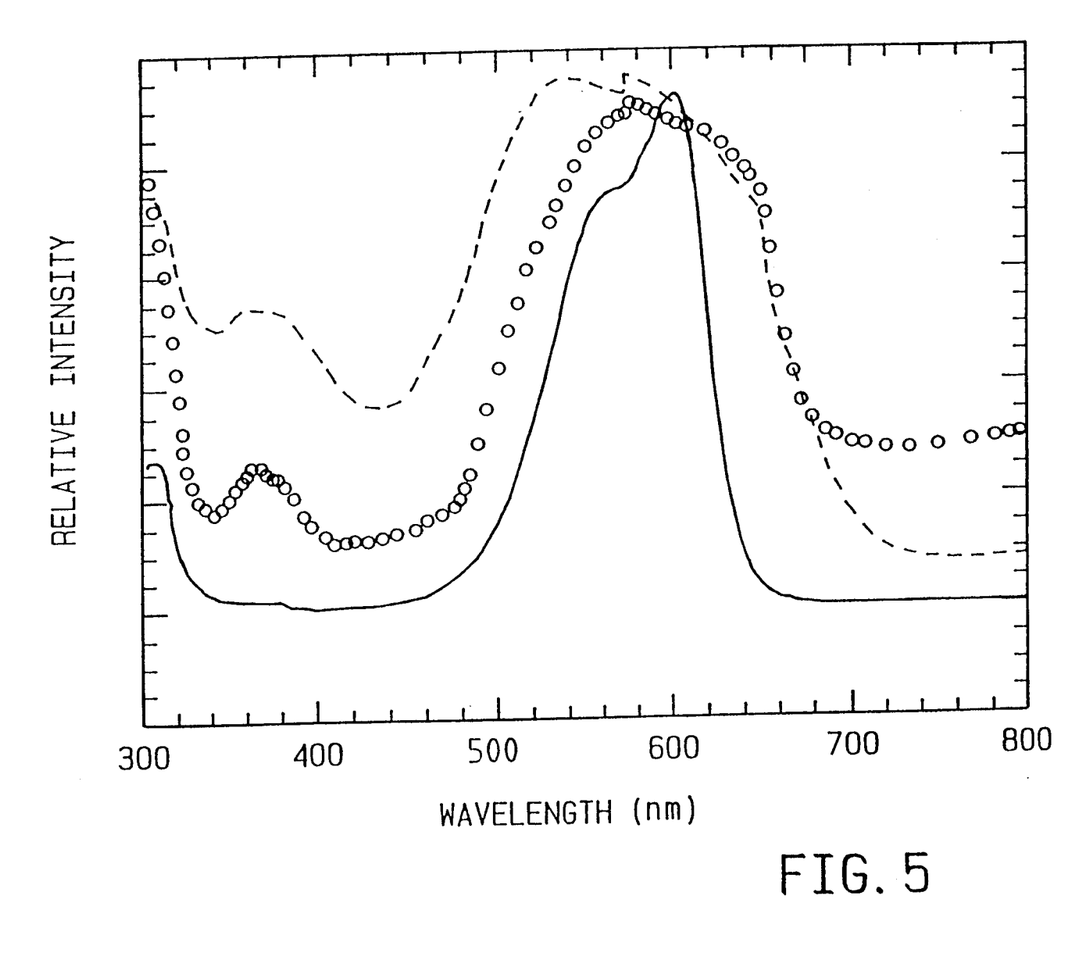
FIG. 5 is a graphical representation of the UV-Visible absorption solution of spectrum of ethyl violet in water (—) and DR spectra of EV as a very thin film (○) and syn. EV-hectorite (- - -)
Figure 6:
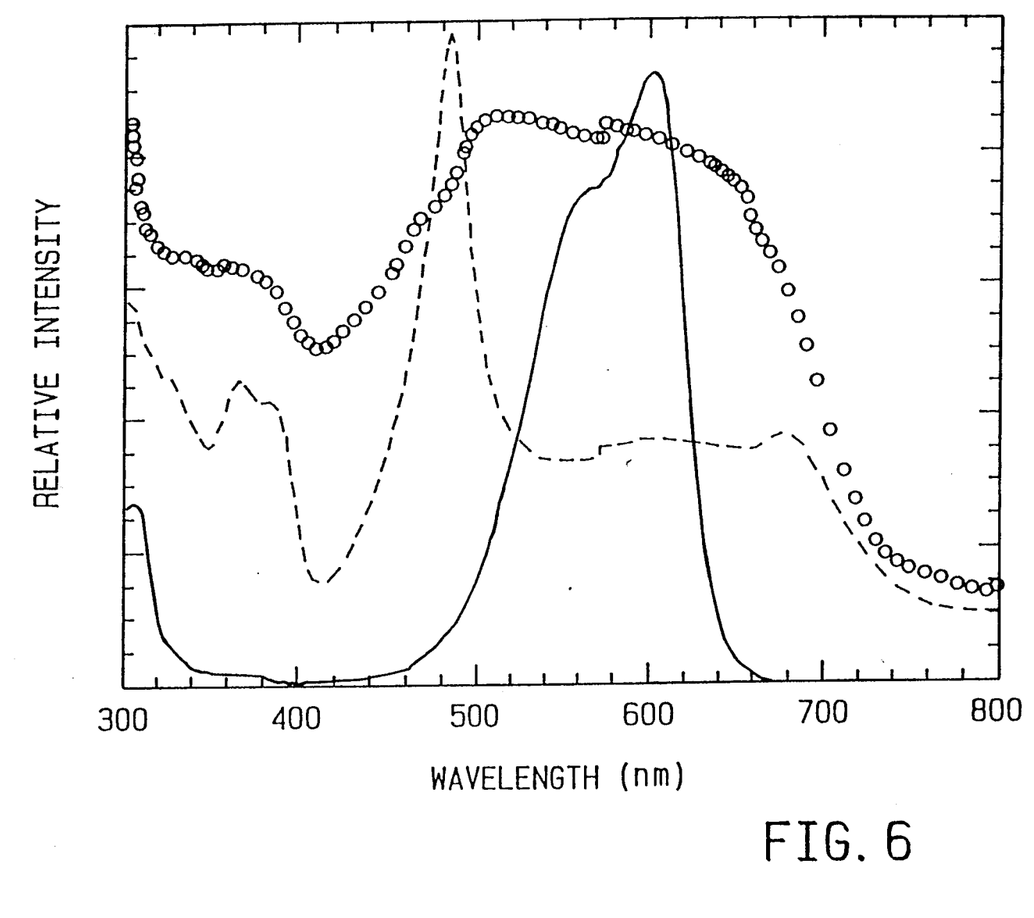
FIG. 6 is a graphical representation of the UV-visible absorption solution spectrum of ethyl violet in wat (—) and DR spectra of EV as a concentrated film (- - -) EV-SHCa (○)
Figure 7:
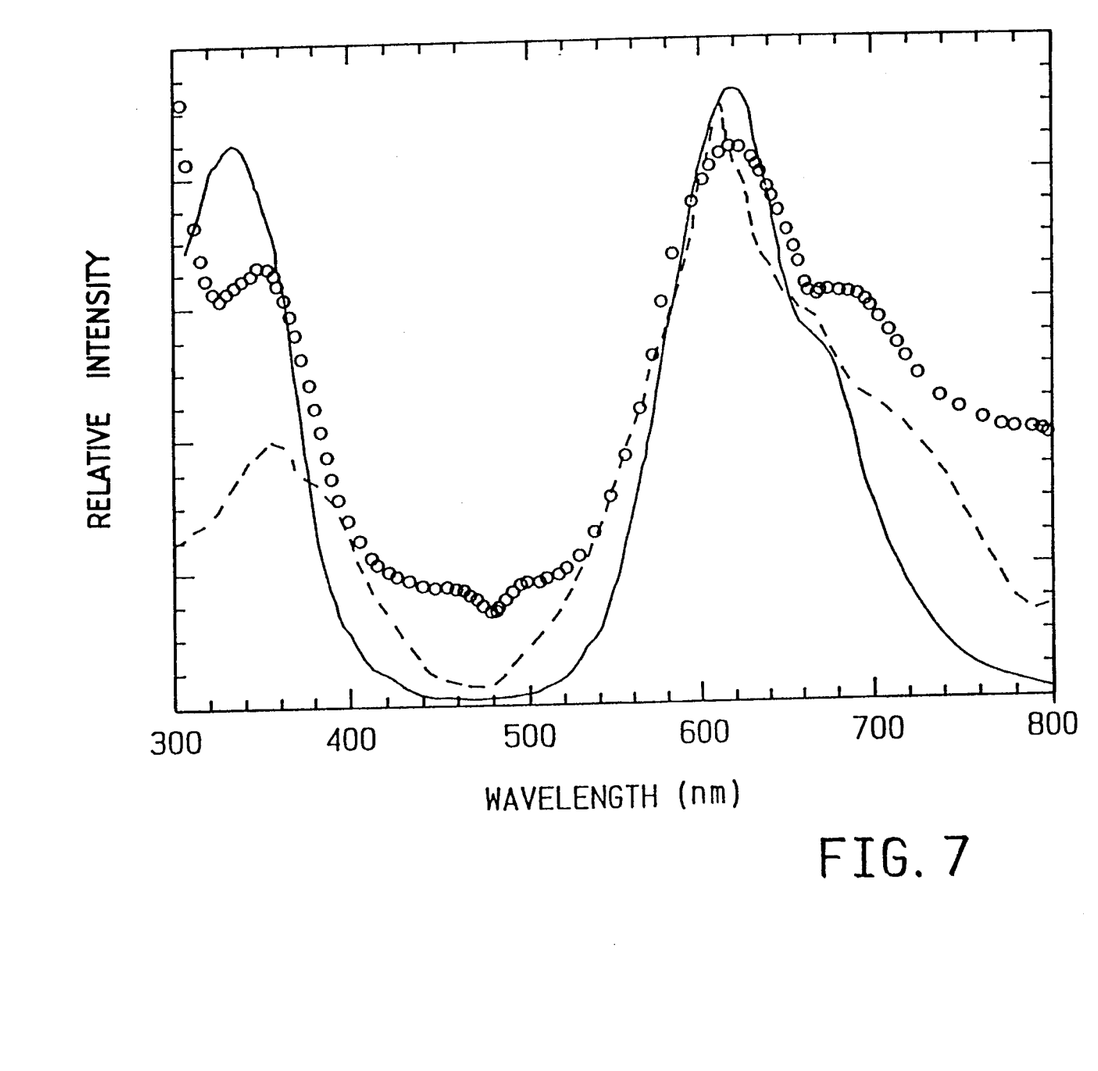
FIG. 7 is a graphical representation of the UV-Visible absorption solution spectrum of the pyridine variant of alcian blue in water (—) and DR spectra of its thin film (○) and syn. AB,pyr-hectorite (- - -)
Figure 8:
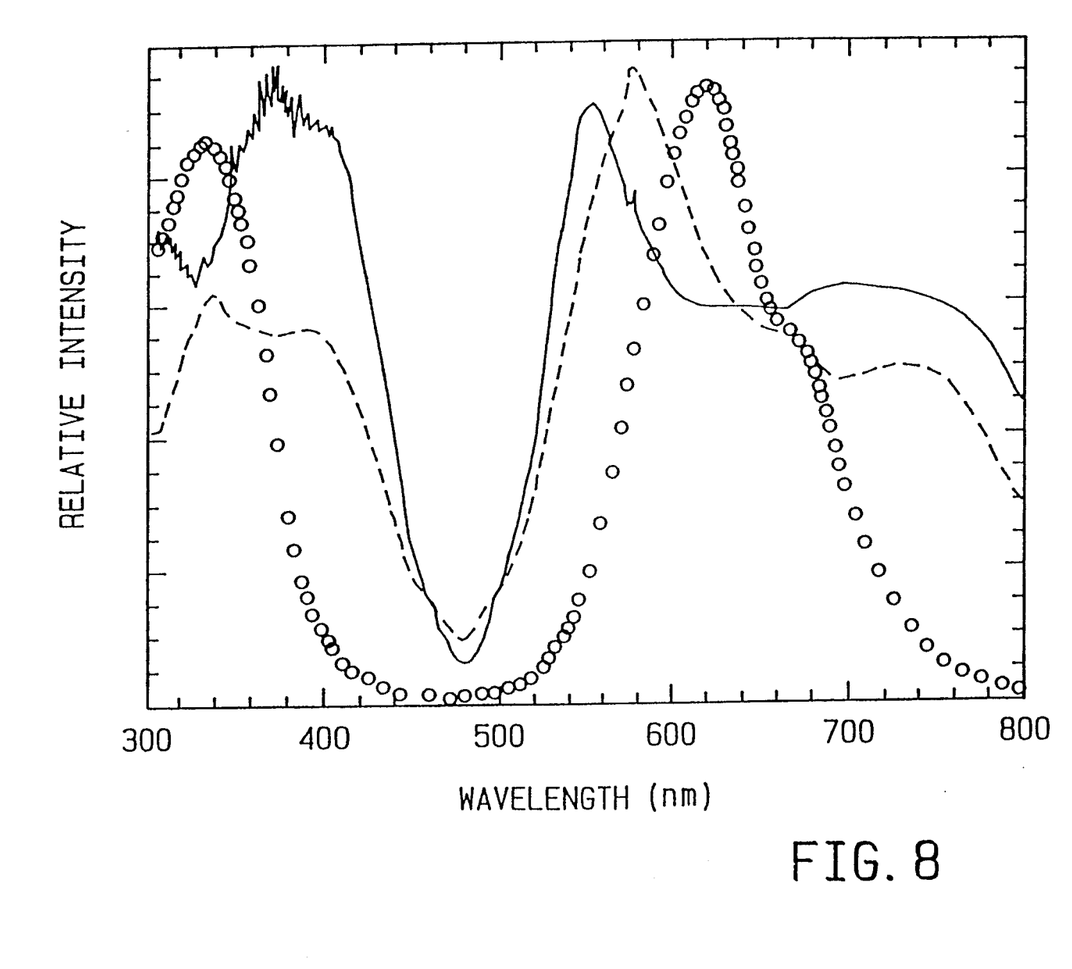
FIG. 8 is a graphical representation of UV-Visible absorption solution spectrum of the pyridine variant of alcian blue in water (•) and DR spectra of its concentrated film (—and AB,pyr-SHCa (- - -)

In FIGS. 5 and 6 are displayed UV-visible spectra for the ethyl violet system, including a solution spectrum of the dye in water, DR spectra of syn. EV-hectorite and a very thin dye film (FIG. 5), and DR spectra of EV-SHCa and a more concentrated dye film (FIG. 6). Very dilute solutions of EV in water give a $\pi \rightarrow \pi$ absorption band with a maximum at 595 nm, designated as band $\alpha$. More concentrated solutions display metachromasy, i.e. the clear development a band designated as B with a maximum at 550 nm, accompanied by a relative decrease in the intensity band $\alpha$. Further increases in concentration result in higher intensity ratios of $\beta/\alpha$. The DR spectrum of a thin film of EV is a broad band encompassing the entire region of both bands. The DR spectrum of syn. EV-hectorite is similar, but the maximum is shifted to about 535 nm. FIGS. 7 and 8 display spectra for analogous samples in the alcian blue, pyridine variant system. Peak positions are summarized in Table III. Notice that the maximum absorption bands does not deviate much from 615 nm in FIG. 7, but that in FIG. 8 this band shifts to 570 nm and to 545 nm for AB,pyr-SHCa and a concentrated film of the dye, respectively.

Figure 9:
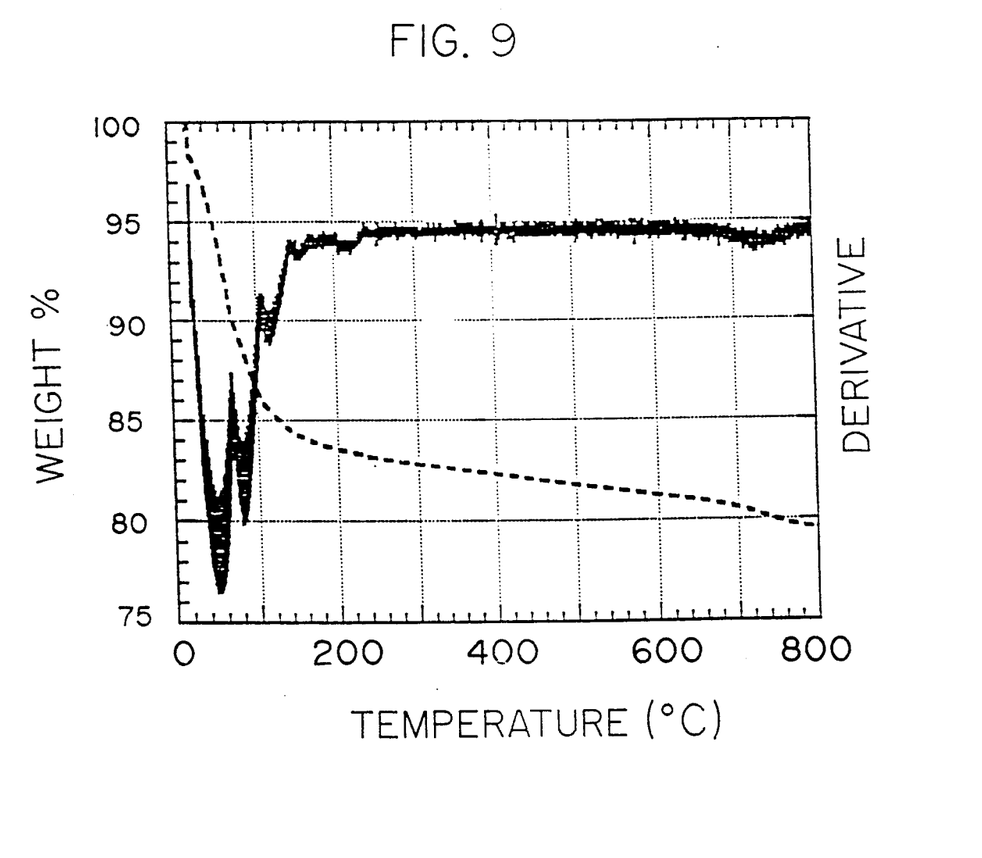
FIG. 9 is a graphical representation of the TGA/DTG plots of synthetic Li-hectorite; weight loss curve (- - -) and derivative curve (—)
Figure 10A:
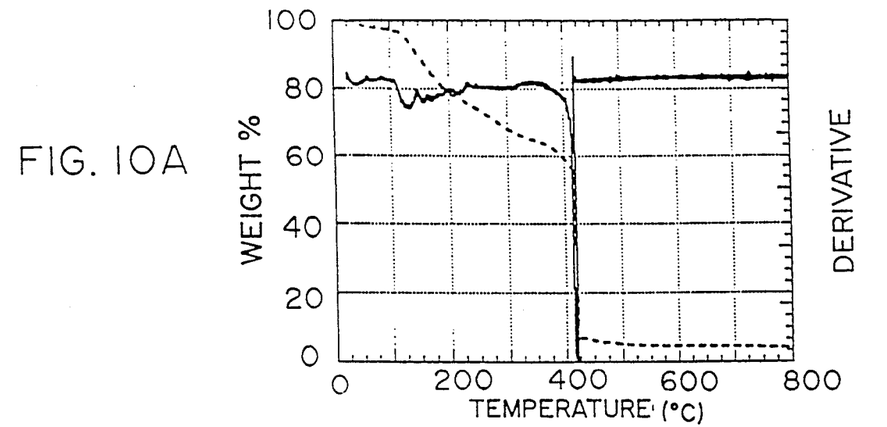
FIGS. 10a, 10b and 10c are graphical representations of TGA/DTG plots of the alcian blue system: (a) AB 8GX chloride salt (b) AB-SHCa (c) syn. AB-hectorite; weight loss curves (- - -) and derivative curves (—)
Figure 10B:
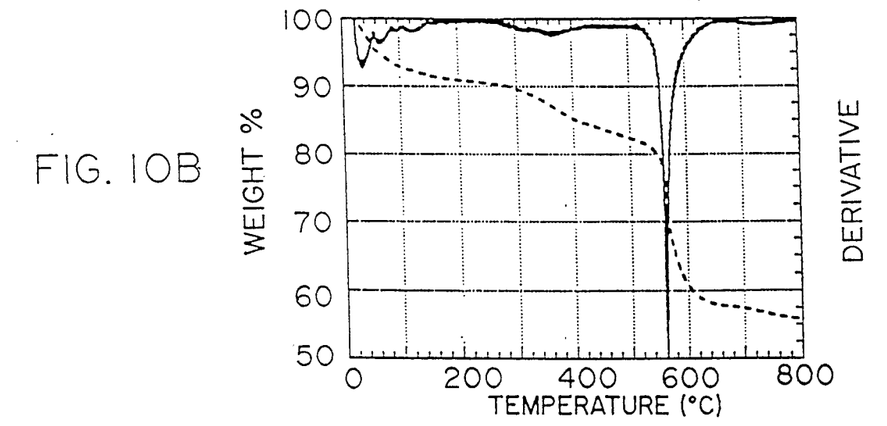
Figure 10C:
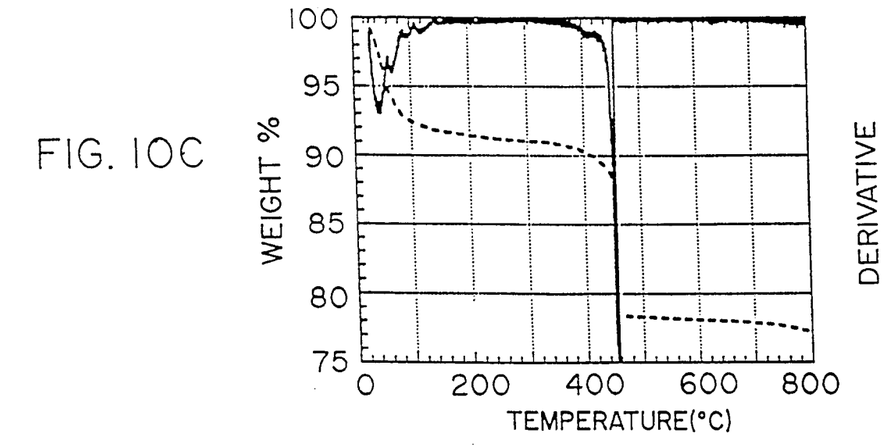
Figure 11A:
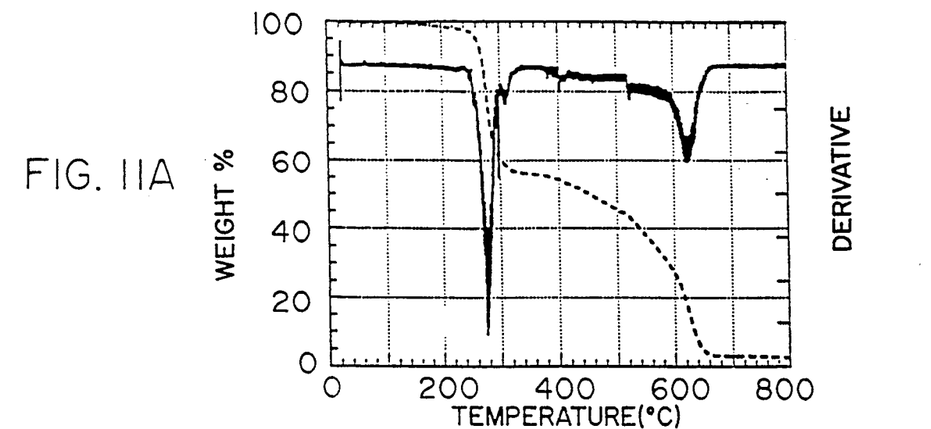
FIGS. 11a, 11b and 11c are graphical representations of TGA/DTG plots of the ethyl violet system: (a) EV chloride salt (b) EV-SHCa (c) syn. EV-hectorite; weight loss curves (- - -) and derivative curves (—).
Figure 11B:
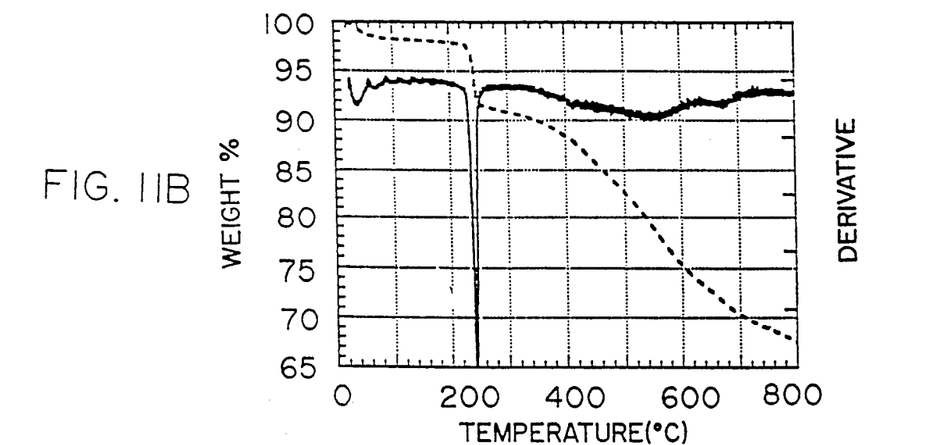
Figure 11C:
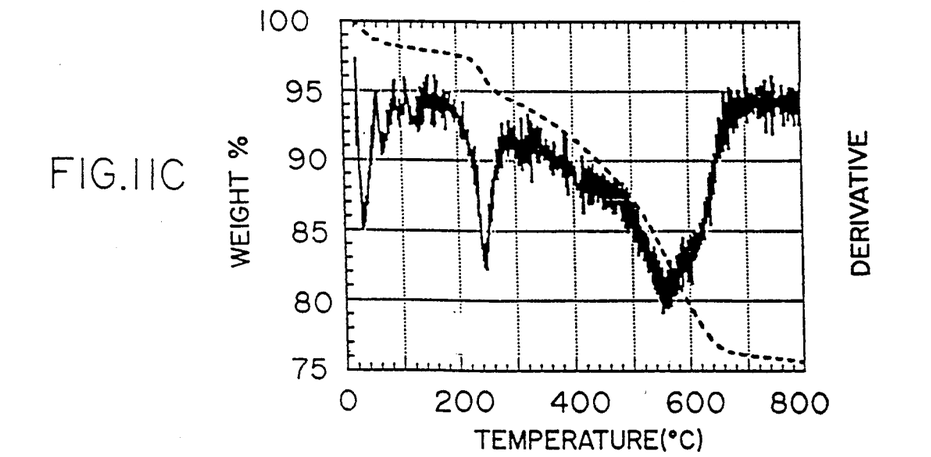

Two curves are presented in each plot: the thermal gravimetric (TG) weight loss curve and the derivative of this curve, also referred to as differential thermal gravimetry (DTG). FIG. 9 gives the weight loss and derivative curves for synthetic Li-hectorite, which is very typical of all smectite clays. The first feature corresponds to loss of surface and interlayer water to about 150° C. It is an uneven heating profile for the furnace at these low temperatures that accounts for the appearance of several differential peaks in this region. The only other feature occurs at 730° C. and is due to dehydroxylation of the clay layers. For the natural hectorite SHCa (washed and purified) the plots are virtually identical, except that dehydroxylation occurs at about 680° C. Although all samples were analyzed, only two series—the alcian blue and ethyl violet systems, respectively—are represented by FIGS. 10 and 11. The rest of the data are summarized in Table IV.

TABLE I

Physical Properties of Synthetic and Ion-Exchanged Hectorites.

| SAMPLE | XRD d(001), Å | % C | % N | Theor. C/N | Exptl. C/N |
|---|---|---|---|---|---|
| Dyes |  |  |  |  |  |
| Ethyl Violet-SHCa | 23.7 | 24.20 | 2.34 | 10.3 | 12.1 |
| syn. EV-hectorite | 21.5 | 14.78 | 2.02 | 10.3 | 8.5 |
| Methyl Green-SHCa | 19.5 | 16.89 | 1.92 | 9 | 10.3 |
| syn. MG-hectorite | 15.9 | 5.53 | 0.88 | 9 | 7.3 |
| Alcian Blue-SHCa | 14.1 | 20.80 | 4.98 | 4.7 | 4.9 |
| syn. AB-hectorite | 14.0 | 8.19 | 2.36 | 4.7 | 4.1 |
| AB,pyr-SHCa | 15.7 | 21.08 | 4.59 | 5 | 5.4 |
| syn. AB,pyr-hectorite | 15.7 | 5.77 | 1.49 | 5 | 4.5 |
| TM Complexes |  |  |  |  |  |
| Ru(II)(phen)$_3$-SHCa | 18.3 | 18.61 | 2.92 | 6 | 7.4 |
| syn. Ru(phen)$_3$-hectorite | 18.6 | 8.97 | 1.73 | 6 | 6.0 |
| Co(III)sepulchrate-SHCa | 17.1 | 4.11 | 3.06 | 1.5 | 1.6 |
| syn. Co(III)sep-hectorite | 14.1 | 1.36 | 1.39 | 1.5 | 1.1 |
| Clays |  |  |  |  |  |
| syn. Li-hectorite | 16.0 |  |  |  |  |
| SHCa-1, as received | 15.2 |  |  |  |  |
| SHCa-1, purified | 15.2 |  |  |  |  |

SHCa = natural hectorite

TABLE II

Organic Cation Exchange Capacities (C.E.C.) and Surface Areas of Organo-Clays.

| Ion-Exchanged SHCa | C.E.C. meq/100 gm | Surface Area (m$^2$/gm) |
|---|---|---|
| ethyl violet | 59 | 96 |
| methyl green | 95 | 85 |
| alcian blue | 90 | <5 |
| alcian blue, pyridine variant | 110 | <5 |
| Ru(II)(o-phenanthroline) | 69 | 63 |
| Co(III)sepulchrate | 63 | 209 |
| purified SHCa | ≈80 | 71 |
| synthetic hectorite |  |  |
| Li-hectorite (SLH) | — | 199 |
| ethyl violet | 37 | 172 |
| methyl green | 32 | 198 |
| alcian blue | 36 | 206 |
| alcian blue, pyridine variant | 31 | 167 |
| Ru(II)(o-phenanthroline) | 33 | 232 |
| Co(III)sepulchrate | 63 | 158 |
| tetrakis(N-methyl-pyridyl)porphyrin | 50 | 166 |
| TAP | 42 | 151 |
| Fe(III)TAP | 33 | 265 |

TAP = tetrakis(N,N,N-trimethyl-anilinium)porphyrin

TABLE III

UV-Visible Absorption Data for Dye Systems.

| Sample | | |
|---|---|---|
| alcian blue, pyridine variant | Peak Position (nm) | |
| solution in water | 329, 614, 673 (shoulder) | |
| dilute film | 348, 614, 675 | |
| synthetic hectorite | 360, 615, 670 (shoulder) | |
| SHCa | 335, 390, 570, 730 | |
| concentrated film | 360, 546 | |
| ethyl violet | $\gamma$-band | $\beta$-band | $\alpha$-band |
| solution in water |  | 558 | 594 |
| dilute film |  | 575 |  |
| synthetic hectorite |  | 535 |  |
| SHCa | 500 |  |  |
| concentrated film | 481 |  |  |

TABLE IV

Thermal Gravimetric Analysis/Differential Thermal Gravimetry (TGA/DTG) Data

| | | Maximum DTG Temperature, °C. (wt %) of Weight Loss Regions | | |
|---|---|---|---|---|
| Sample | wt % H$_2$O | Region I | Region II | Region III |
| Alcian Blue |  |  |  |  |
| pure dye | 3.0 | 150 (34%) | 420 (62%) |  |
| SHCa | 8.0 | 365 (6.1%) | 565 (24%) | 710 (2.0%) |
| syn. hectorite | 8.3 |  | 450 (12%) | 750 (0.8%) |
| Alcian Blue, pyr |  |  |  |  |
| pure dye | 6.9 | 307 (28%) | 410 (59%) |  |

TABLE IV-continued

Thermal Gravimetric Analysis/Differential Thermal Gravimetry (TGA/DTG) Data

| Sample | wt % H$_2$O | Maximum DTG Temperature, °C. (wt %) of Weight Loss Regions | | |
|---|---|---|---|---|
| | | Region I | Region II | Region III |
| SHCa | 3.3 | 410 (3.2%) | 580 (20%) | 700 (5.2%) |
| syn. hecgtorite | 5.9 | 330 (1.1%) | 515 (9.6%) | 785 (1.3%) |
| Ethyl Violet | | | | |
| pure dye | | 278 (41%) | 623 (42%) | |
| SHCa | 1.8 | 240 (6.9%) | 545 (17%) | 666 (4.0%) |
| syn. hectorite | 2.1 | 243 (3.4%) | 555 (18%) | 750 (0.6%) |
| Methyl Green | | | | |
| pure dye | 3.5 | 195 (4.3%) | 300 (18%) | 562 (54%) |
| SHCa | 1.4 | 225, 245 (1.6%) | 567 (14%) | 675 (10%) |
| syn. hectorite | 5.0 | | 555 (9.5%) | 795 (1.5%) |
| Ru(II)(o-phenanthrolite) | | | | |
| chloride salt | 8.6 | 430 (57%) | | |
| SHCa | 3.3 | 395 (22%) | | |
| syn. hectorite | 2.3 | 441 (13%) | | 790 (0.4%) |
| Co(III)sepulchrate | | | | |
| chloride salt | 3.4 | 290 (27%) | 448 (11%) | 584 (32%) |
| SHCa | 9.0 | 222 (2.0%) | 578 (9.2%) | |
| syn. hectorite | 4.7 | | 480 (4.2%) | 780 (1.9%) |

Temperatures of decomposition are assigned from the maxima in the DTG plots. For the clay systems, region III comprises the clay dehydroxylation peak.

X-ray powder diffraction was the primary technique for determining whether or not a synthesis was successful, based on the presence of a crystalline product with little or no impurities. The absence of non-clay peaks from 3 to 70°2Θ precludes the presence of crystalline impurities such as lithium oxides, lithium silicates, quartz, or unreacted LiF. Microanalysis determinations were equally as important because these indicated the nature of the interlayer species. For example, the transition metal complexes $Fe(CN)_6^{3+}$ and $Co(NH_3)_6^{2+}$, when utilized as templates, gave synthetic hectorites with d(001) spacings of about 14 Å each. Extremely small quantities of %C,H,N were analyzed by microanalysis, however, indicating that the metal complexes were not incorporated under the synthetic conditions and had likely hydrolyzed. The C/N ratios for successful samples, listed in Table I, are within reasonable limits to the theoretical values. In nearly all cases, the C/N ratio for synthetic hectorites is slightly lower than expected, especially for the EV and MG dyes. It is probable that the alkyl ammonium groups (see FIG. 2) hydrolyze to a small degree in these cases.

The d(001) spacings given in Table I are quite varied. Orientation information, i.e. how the template is aligned in the clay gallery, can be assigned from these data in a qualitative way. For example, methyl green may be oriented more perpendicular to the clay layers in the natural hectorite (19.5 Å) than in the synthetic sample (15.9 Å). XRD spectra of the synthetic powders show that the only crystalline phase present is due to clay, see FIG. 3, along with a broad background peak in the 10-12° 2Θ region characteristic of excess amorphous silica. Excess silica is present on the order of roughly 25% of sample, so the information in Table II is skewed accordingly In other words, the true organic cation exchange capacity values are somewhat higher than shown, and the true surface areas are correspondingly lower (since amorphous silica usually displays an appreciable surface area).

By combining the information in Tables I and II, some trends are apparent. The dyes EV and MG can be compared since they have similar structures that vary by the number of cationic charges. Ethyl violet-SHCa, with its higher d-spacing but lower c.e.c. than MG-SHCa, has about 10% more surface area. The thin film of EV-SHCa also displays a (002) reflection in the XRD spectrum while MG-SHCa does not, which indicates a higher degree of ordering. The two alcian blue dyes examined differ only in the structure of the peripherally charged group—a pyridinium salt vs. an isothiuronium salt. For both dyes there is virtually no difference in d(100) for ion-exchanged vs. synthetic hectorite. The c.e.c. for both SHCa samples is very high (the pyridine variant is 110 meq/100 gm, about 30% higher than the expected value). The surface areas for these ion-exchanged samples are negligible. It may be suggested that at high added concentrations of dye, clay aggregates are formed and coated with dye. However, the pyridine variant has a d(001) 1.7 Å higher than the isothiuronium salt. This means that at least this dye manages to penetrate into the aggregates to some degree. The lack of a (002) reflection in the thin film XRD spectra is, again, evidence of poor ordering.

Finally, the transition metal complexes ion-exchanged into SHCa give highly ordered films (a (002) reflection is evident). In fact, the surface area of Co(III) sepulchrate-SHCa is unusually high at about 200 mz/gm. Since the d-spacings are different for the ion-exchanged and synthetic Co(III)sepulchrate, it can be assumed that the template is perpendicular to the layers in the former case and parallel in the latter. There is virtually no difference for the bulky, symmetrical Ru-(II)phenanthroline templating cation. A (002) reflection is never observed in thin films of synthetic, crystallized hectorites, indicating the low degree of ordering for those materials compared to some of the ion-exchanged analogs.

Ethyl violet is a metachromic dye, that is the spectrum of its aqueous solution is dependent upon the concentration of the dye. The absorption o band at 595 nm is characteristic for dilute aqueous solutions and is attributed to the monomeric form of the dye. Increasing dye concentration results in the gradual replacement of this band by one at a shorter wavelength (520-550 nm, band β). Further increases in concentration may cause replacement of band β with another more diffuse band γ at about 510 nm. These shifts have been attributed to the formation of dimers (β band) and higher aggregates (γ band) in the aqueous solution. Since the α-band is a π→π transition, a blue (metachromic) shift is an indication of interactions. Accordingly, dye aggregation is probably caused by interaction between π electrons of the aromatic rings of overlapping dye cations. It has recently been shown that when EV is adsorbed by kaolinite from aqueous solution it undergoes metachromasy, which was compared to similar behavior on the surfaces of polyelectrolytes. In these cases, metachromasy is an indication of dimerization and polymerization of the adsorbed dyes.

These effects are evident in FIGS. 5 and 6. The β-band appears at 535 nm for syn. EV-hectorite. Sample EV-SHCa is different, however, because this sample contains a much higher percentage of dye (24%C vs. 15%C in syn. EV-hectorite). The DR spectrum is very diffuse and has a maximum at a much lower wavelength near 510 nm, which corresponds to the γ band due to higher aggregation. A very concentration film of EV is also displayed for comparison, which displays an intense, narrow band centered at 481nm.

Alcian blue is not known to be a metachromic dye, and FIG. 7 does not display differences between samples since the maximum band remains near 615 nm. The more concentrated samples shown in FIG. 8 do exhibit differences, however. The maximum absorption shifts to 570 nm for AB,pyr-SHCa and to 546 nm for a concentrated film of the dye. While syn. AB,pyr-hectorite contains only 5.8%C, AB,pyr-SHCa contains 21.1%C, and aggregation was implicated earlier to explain the very low surface area of these samples. As expected, similar behavior is demonstrated for the analogous AB samples. FIG. 10 displays TGA/DTG plots for the alcian blue series, where the shift in decomposition temperature of the primary weight loss is visually obvious. This DTG peak is at 420° C. for the pure chloride salt of the dye and is shifted to 565° C. when it is loaded onto SHCa. This significant enhancement of its thermal stability (145° C.) is therefore due to an important but as yet undetermined interaction with the clay surface. This material contains clay aggregates that are coated with oligomeric dye molecules. The same is true for the AB, pyridine variant system, where the peak increases by 170° C. when loaded onto SHCa. The difference is much less for the syn. hectorite materials.

The corresponding ethyl violet system is displayed in FIG. 11. A slight destabilization in decompositions is observed for this dye when present in a clay. The primary weight loss peak at 278° C. decreases by 30–40° C., and the secondary peak at 623° C. decreases by 70–80° C. In addition, the ratios of the two regions in terms of weight % change when the clay is present. For example, the weight % ratio for regions I and II in ethyl violet is nearly 1:1 (41% vs. 42%). However, this ratio drops to 0.4:1 and 0.2:1 when loaded onto SHCa and is in the synthetic hectorite, respectively. Concurrent pyrolysis-gas chromatogrpahy-mass spectometry experiments identified chloromethane as one product from decomposition of methyl ammonium chloride substituents on the porphyrin ring. Upon ion-exchange into a clay the chloride ion is displaced and, chloromethane is no longer observed. For ethyl violet, loss of chloroethane would amount for only 13% by weight, so the answer for this system is more complicated. The methyl green system is also quite complex (see Table IV).

In summary, a general method for the hydrothermal synthesis of hectorite-type silicate clays that include a wide variety of organic or organometallic intercalants or templates has been developed. Products crystallize after just two days of reaction, and can contain any of the following intercalants which in all cases can be photochemically active or electrochemically active or catalytically active or mixtures thereof: (a) organic dye molecules such as ethyl violet and methyl green (b) dye molecules such as alcian blue that are based on a Cu-(II)phthalocyanine complex (c) porphyrins and metalloporphyrins, and (d) transition metal complexes such as Ru(II)phenanthroline and Co(III)sepulchrate. Necessary requirements for the organic template are: (i) water-solubility (ii) positive charge and (iii) stability under basic, aqueous reflux conditions. Montmorillonite-type clays can include a similarly wide variety of intercalants or templates by hydrothermally treating for about 4 hours at elevated temperatures of about 300° C. or greater and pressures which are autogenous of about 1300 psi. These methods provide an alternative avenue for supporting an array of functional molecules on a heterogeneous support and offer the possibility of novel catalytic and materials properties.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of incorporating an organic or organometallic template in crystalline layer-silicate clays, comprising heating a silica gel and a hydroxide of Mg, Al or mixtures thereof and LiF and an organic or organometalli template material selected from the class consisting of photochemically active or electrochemically active or catalytically active materials, at a temperature and pressure and for a time sufficient to form a crystalline clay material containing an organic or organometallic templates.

2. The method of claim 1, wherein the organic or organometallic has a positive charge, is soluble in water and is stable at synthesis conditions of temperature, pressure, pH and time required to form the crystalline clay material.

3. The method of claim 1, wherein the molar ratio of organic or organometallic material to LiF to hydroxide to $SiO_2$ is about $$\frac{0.066}{n}:$$

0.20: 1.11:1.52±10%, where n is the number of positive ions per molecule of the organic or organometallic.

4. The method of claim 1, wherein a synthetic hectorite clay is produced.

5. The method of claim 1, wherein the heating is by aqueous refluxing at about 100° C., at about 1 atmosphere pressure and at a pH greater than 7.

6. The method of claim 5, wherein the time is about three days or less.

7. The method of claim 5, wherein the time is about two days or less.

8. The method of claim 1, wherein the organic or organometallic is a water-soluble porphyrin or a water soluble metalloprophyrin.

9. The method of claim 8, wherein the water-soluble porphyrin or metalloporphyrin is one or more of tetrakis(N-methyl-pyridyl)porphyrin or tetrakis(N,N,N-trimethyl-anilinium)porphyrin or the transition metal halide salts thereof.

10. The method of claim 9, wherein the transition metal is one or more of Fe or Cu or Ni.

11. The method of claim 1, wherein the organic orqanometallic template material is an organic dye or a transition metal phenanthroline or sepulchrate.

12. The method of claim 1, wherein the template material is one or more of alcian blue or ethyl violet or methyl green or Ru (II) phen$_3$ dichloride or Co (III) sepulchrate trichloride.

13. A method of incorporating an organic or organometallic template in crystalline layer-silicate clays, comprising heating a silica gel and a hydroxide of Mg, Al or mixtures thereof and NHF and an organic or organometallic material selected from the class consisting of photochemically active or electrochemically active or catalytically active materials, at a temperature and pressure and for a time sufficient to form a crystalline clay material containing the organic or organometallic templates.

14. The method of claim 13, wherein the template is a Ru bipyridyl or phenanthroline.

15. The method of claim 14, wherein the temperature is about 300° C., the time is about four hours and the pressure is autogeneous.

16. The method of claim 13, wherein a slurry of $Al_2O_3$ and Mg acetate and $NH_4F$ and an organic or organometallic material is formed and heated to a temperature of about 100° F., a silica sol is added and the pH adjusted to in excess of 10 and stirred while the temperature is maintained at about 592° F. for a period of about 4 hours and thereafter dried to produce a montmorillonite-type clay with an organic or organometallic template.

17. The method of claim 16, wherein the template is Ru (II) bipyridyl.

18. The method of claim 16, wherein the template is Ru (II) phenanthroline.

19. A method of incorporating an organic or organometallic template in crystalline layer-silicate clays, comprising forming a slurry of $Al_2O_3$, Mg acetate, $NH_4F$ and an organic or organometallic material selected from the class consisting of photochemically active materials; mixing the slurry with a silica sol with pH adjusted to in excess of 10 while heating to maintain the temperature at about 300° C. for a period of about 4 hours and thereafter drying the mixture to produce a montmorillonite-type clay with an organic or organometallic template.

20. The method of claim 19, wherein the template is an organometallic template selected from the group consisting of Ru (II) bipyridyl and Ru (II) phenanthroline.

* * * * *